(12) United States Patent
Yamaguchi et al.

(10) Patent No.: US 7,586,823 B2
(45) Date of Patent: Sep. 8, 2009

(54) INFORMATION RECORDING APPARATUS AND INFORMATION RECORDING METHOD

(75) Inventors: Atsushi Yamaguchi, Tokorozawa (JP); Masahiro Kato, Tokorozawa (JP); Eiji Muramatsu, Tokorozawa (JP); Shoji Taniguchi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 409 days.

(21) Appl. No.: 10/546,719

(22) PCT Filed: Feb. 25, 2004

(86) PCT No.: PCT/JP2004/002169

§ 371 (c)(1),
(2), (4) Date: Aug. 24, 2005

(87) PCT Pub. No.: WO2004/077419

PCT Pub. Date: Sep. 10, 2004

(65) Prior Publication Data

US 2006/0153038 A1    Jul. 13, 2006

(30) Foreign Application Priority Data

Feb. 28, 2003  (JP) .............................. 2003-054374

(51) Int. Cl.
   *G11B 7/0045* (2006.01)
(52) U.S. Cl. .................. 369/59.11; 369/47.51
(58) Field of Classification Search ........... 369/59.1, 369/59.13, 59.11, 47.5, 47.51
   See application file for complete search history.

(56) References Cited

U.S. PATENT DOCUMENTS

| 5,732,062 | A  | * | 3/1998 | Yokoi et al. ................. 369/116 |
| 6,018,508 | A  | * | 1/2000 | Hasegawa ................. 369/59.11 |
| 6,256,277 | B1 | * | 7/2001 | Saga et al. ................. 369/59.24 |
| 6,272,100 | B1 | * | 8/2001 | Toda et al. .................. 369/116 |
| 6,343,056 | B2 | * | 1/2002 | Miyamoto et al. ......... 369/59.11 |
| 6,404,716 | B1 | * | 6/2002 | Saga et al. ................. 369/59.11 |
| 6,426,929 | B1 | * | 7/2002 | Watabe et al. ............ 369/59.12 |
| 6,459,666 | B1 | * | 10/2002 | Yokoi ...................... 369/47.15 |
| 2002/0080702 | A1 | * | 6/2002 | Asada et al. ............... 369/59.1 |

FOREIGN PATENT DOCUMENTS

| EP | 1 249 834 | 4/2002 |
| EP | 1 434 206 | 12/2003 |
| JP | 9-134525  | 5/1997 |

(Continued)

OTHER PUBLICATIONS

European Patent Office issued an European Search Report dated Nov. 28, 2008, Application No. 04714445.6.

*Primary Examiner*—Wayne R Young
*Assistant Examiner*—Thomas D Alunkal
(74) *Attorney, Agent, or Firm*—Young & Thompson

(57) ABSTRACT

In a recording strategy suitable for high-speed recording, a laser driving signal includes a top pulse having a pulse width corresponding to a recording mark length and multi-pulses having a period 3-times larger than a base clock period of a recording mark. The top pulse is has the first identical-shape top pulses when the recording mark length is 3nT ("n" is a natural number), the second identical-shape top pulses when the recording mark length is (3n+1)T, and the third identical-shape top pulses when the recording mark length is (3n+2)T.

14 Claims, 15 Drawing Sheets

FOREIGN PATENT DOCUMENTS

| | | |
|---|---|---|
| JP | 11-175976 | 7/1999 |
| JP | 2001-331936 | 11/2001 |
| JP | 2003-30833 | 1/2003 |
| JP | 2003-30836 | 1/2003 |

* cited by examiner

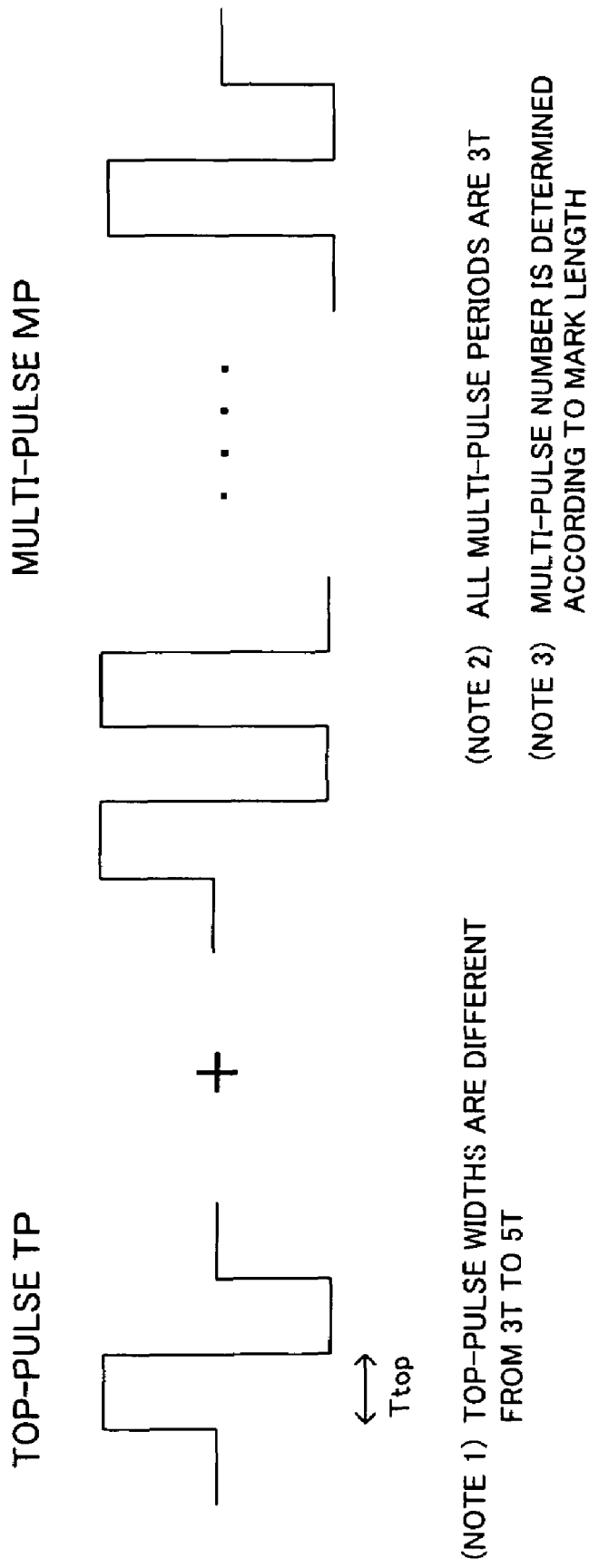

FIG. 13

|  | Sample A | Sample B |
|---|---|---|
| Pw [mW] | 16 | 18 |
| Pe [mW] | 8 | 9 |
| Pb [mW] | 0.7 | |
| 3nTtop [T] | 1.08 | 1.00 |
| 3nTdtop [T] | -0.20 | -0.20 |
| (3n+1)Ttop [T] | 1.20 | 1.12 |
| (3n+1)Tdtop [T] | 0.60 | 0.64 |
| (3n+2)Ttop1 [T] | 1.00 | 0.96 |
| (3n+2)Ttop2 [T] | 1.00 | 0.92 |
| 3Tcl [T] | 1.00 | 1.28 |
| 4Tcl [T] | 1.76 | 2.04 |
| 5-14Tcl [T] | 1.16 | 1.44 |
| Tmp [T] | 1.24 | 1.16 |
| Jitter [%] | 8.55 | 7.68 |
| SIGNAL MODULATING DEGREE (I14/I14H) | 0.690 | 0.680 |
| Signal asymmetry | 0.027 | 0.009 |

INFORMATION RECORDING APPARATUS AND INFORMATION RECORDING METHOD

BACKGROUND OF THE INVENTION

1. Field of the Invention

This invention relates to a method of optically recording information on an information recording medium.

2. Description of the Related Art

Onto a recordable or rewritable optical disc such as a DVD-R (DVD-Recordable) or a DVD-RW (DVD-Rerecordable), information is recorded thereon by irradiating a laser beam on its recording surface. At the areas on the recording surface of the optical disc where the laser beam is irradiated, the property of the optical recording medium forming the optical disc is physically changed because of the increased temperature. This generates recording marks on the recording surface.

Therefore, if the laser beam is modulated by a pulse waveform (it is called "strategy") corresponding to information to be recorded, and irradiated on the optical disc, recording marks having lengths corresponding to the information to be recorded can be formed on the optical disc.

As a strategy for recording the information on a rewritable optical disc such as a DVD-RW, there is well known a strategy including a top pulse and multi-pulses (they are also called "pulse train") of the number corresponding to recording mark lengths. For instance, an example thereof is disclosed in Japanese Patent No. 2801510.

Recently, there is a demand of the strategy which is adapted to high-speed recording of more than 4-times higher speed, for the purpose of improvement of a recording speed. However, according to the strategy which utilizes the above-mentioned multi-pulse, ON/OFF switching of the pulse has to be executed within a time of 1T ("T" indicates a base clock period of a recording signal) because multi-pulse number is increased in 1T unit corresponding to the recording mark length. Therefore, if the base clock becomes higher speed in the high-speed recording and the time of 1T becomes shorter, it becomes difficult to obtain an accurate emitting waveform because the rounding portion of the multi-pulse waveform becomes larger by a transient response. Thus, a recording characteristic of the optical disc is easily affected by differences of characteristics of a laser light source and a driving circuit between recording apparatuses.

Also, since heating by the laser beam and cooling cannot be executed longer than a 1T time period in the multi-pulse period, the mark cannot be formed satisfactorily dependently on the characteristic of the optical disc, and the recording characteristic sometimes becomes worse, like the decrease of a signal modulating degree. The present invention has been achieved in order to solve the above problems.

SUMMARY OF THE INVENTION

The present invention has been achieved in order to solve the above problems. It is an object of this invention to provide an information recording method and an apparatus thereof which are hardly affected by a characteristic of the recording apparatus even during a time of high-speed recording, and which can accurately form pits on an optical disc by ensuring enough time for heating and cooling.

According to one aspect of the present invention, there is provided an information recording apparatus including a signal generating unit which generates a light source driving signal having a top pulse and multi-pulse of a necessary number corresponding to a recording mark length of recording data, and a recording unit which irradiates a recording light on an optical recording medium by driving a light source based on the light driving signal and forms recording marks on the optical recording medium, wherein the signal generating unit includes, a multi-pulse generating unit which generates a multi-pulse having a period 3-times larger than a base clock period T of the recording mark, and a top pulse generating unit which generates first identical-shape top pulses when the recording mark length is 3nT ("n" is an integral number), and second identical-shape top pulses when the recording mark length is (3n+1)T, and third identical-shape top pulses when the recording mark length is (3n+2)T.

According to another aspect of the present invention, there is provided an information recording method including: a signal generating process which generates a light source driving signal having a top pulse and multi-pulse of a necessary number corresponding to a recording mark length of recording data; and a recording process which irradiates a recording light on an optical recording medium by driving a light source based on the light driving signal, and forms recording marks on the optical recording medium, wherein the signal generating process including: a multi-pulse generating process which generates a multi-pulse having a period 3-times larger than a base clock period T of the recording mark; and a top pulse generating process which generates first identical-shape top pulses when the recording mark length is 3nT ("n" is an integral number), and second identical-shape top pulses when the recording mark length is (3n+1)T, and third identical-shape top pulses when the recording mark length is (3n+2)T.

BRIEF DESCRIPTION OF THE DRAWINGS

FIG. 4 is a diagram schematically showing a basic configuration of a laser recording waveform according to the embodiment of the present invention.

FIG. 13 shows pulse widths of laser driving waveforms according to the fourth modification and setting examples of each power level.

DETAILED DESCRIPTION OF THE PREFERRED EMBODIMENTS

The preferred embodiments of the present invention will now be described below with reference to the attached drawings.

Figure 1:
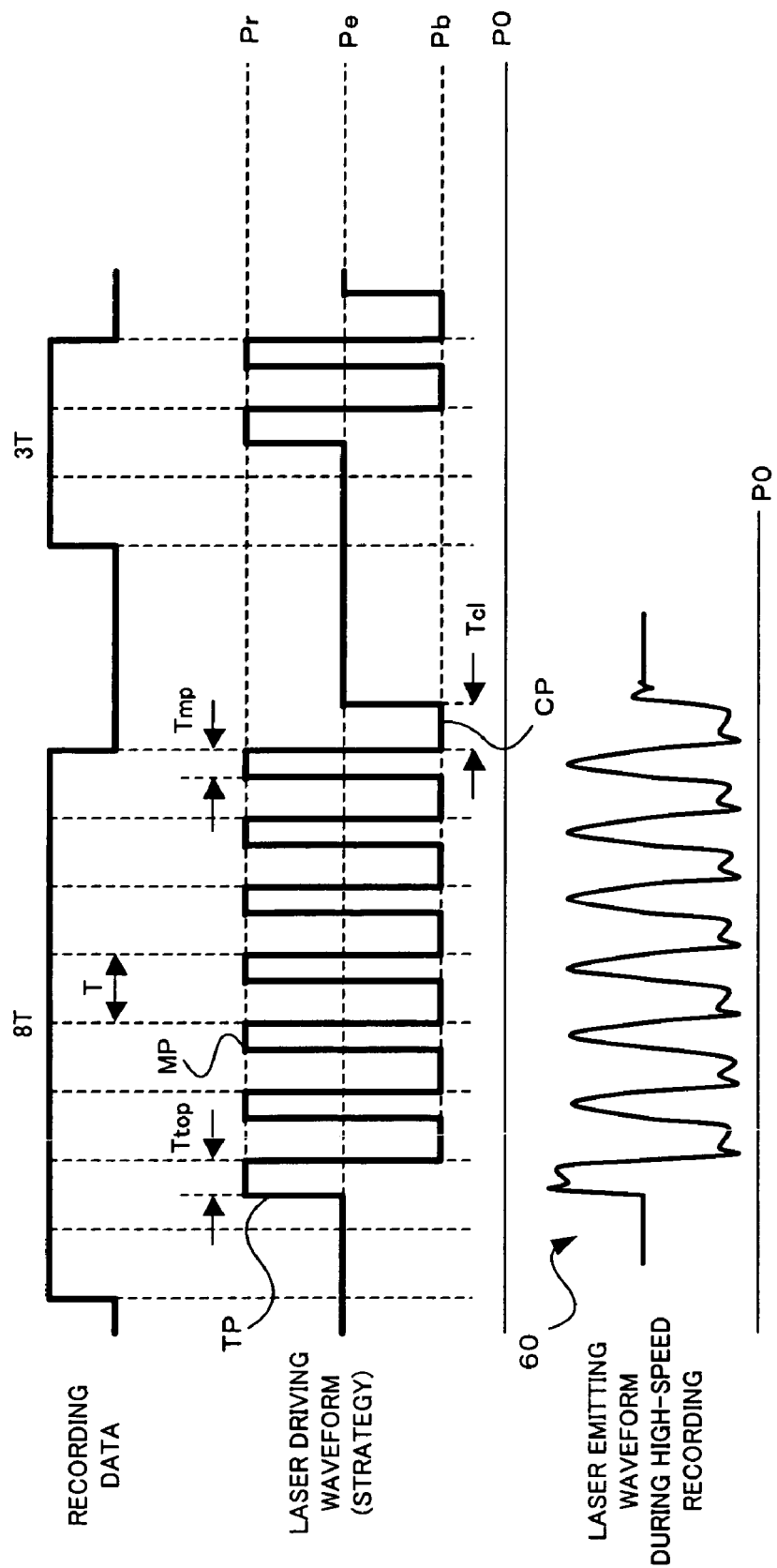
FIG. 1 is a waveform chart showing examples of a strategy and a laser driving waveform during the time of high-speed recording which utilizes a base clock of 1T period.

FIG. 1 shows an example of the strategy utilizing the multi-pulses whose period is 1T. The example illustrates the strategy of the recording data 8T and 3T. As shown in FIG. 1, the strategy is formed by a top pulse TP, a plurality of multi-pulses MP of 1T period and a cooling pulse CP. The number of the multi-pulses MP is determined by a recording data length. In FIG. 1, the widths of the top pulse TP, the multi-pulse MP and the cooling pulse CP are respectively indicated as Ttop, Tmp and Tcl.

A level of the top pulse TP varies between a recording power level Pr and an erasing power level Pe. A level of the multi-pulse MP varies between the recording power level Pr and a bias power level Pb. The cooling pulse CP is equal to the bias power level Pb, and the bias power level Pb is equal to the level which is increased by a predetermined level from a zero level P0.

Since the multi-pulse whose period is 1T is utilized in this strategy, the optical disc cannot be heated and cooled for the time larger than 1T in a multi-pulse interval.

A laser emitting waveform 60 at a bottom of FIG. 1 indicates a laser emitting waveform at the time of the high-speed recording at which the time of 1T is smaller than 10 ns. When the time of 1T becomes smaller than 10 ns, the recording pulse width sometimes becomes smaller than 5 ns. For example, assuming that about 2 ns is respectively needed at rise-up and fall-down time periods of a laser light source, as illustrated in the waveform 60, the pulse waveform which is originally almost rectangular becomes rounded by a transient response, and the pulse waveform cannot keep rectangular shape. Therefore, pits cannot be accurately formed on the disc due to the differences of the characteristics of the laser light source and a driving circuit between the recording apparatuses.

Based on the above-mentioned examination, in the present invention, by setting the pulse widths of each pulse forming the strategy to be larger than 1T, it becomes possible that the pits are accurately formed even in the high-speed recording. Basically, the laser driving waveform (strategy) corresponding to the recording mark length is formed by one top pulse, necessary number of multi-pulses corresponding to the recording mark length, and one cooling pulse. Therefore, in a case of a short recording mark, the laser driving waveform is formed by the combination of one top pulse and one cooling pulse. In a case of a long recording mark, the laser driving waveform is formed by one top pulse, the necessary number of the multi-pulses and one cooling pulse.

When the above-mentioned laser driving waveform is utilized, it is basically needed that the widths of the top pulse and the multi-pulse are appropriately determined in order to correspond to the high-speed recording. Therefore, in the present invention, the widths of the top pulse and the multi-pulse are determined as follows.

Figure 2A:
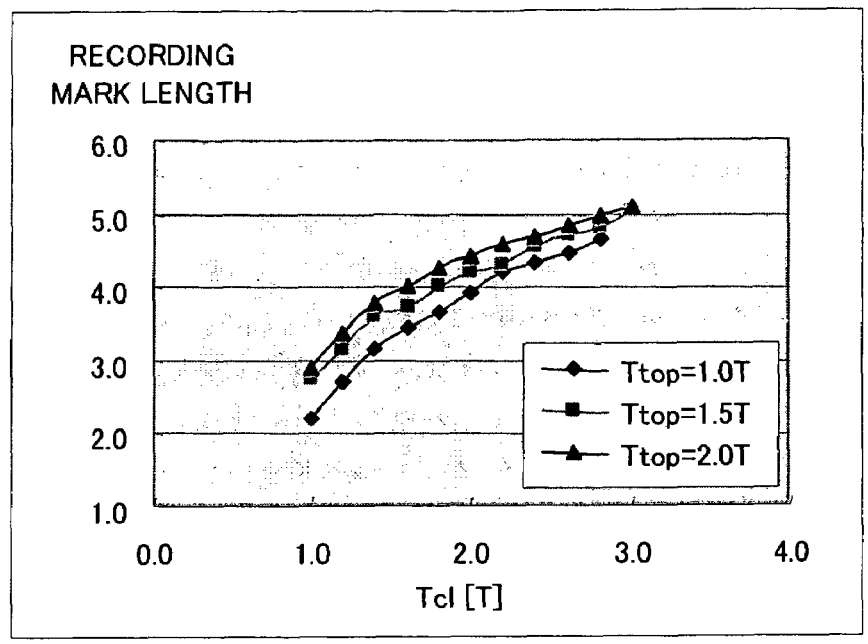
FIG. 2A is a graph showing an examined result of a recordable recording mark length by a combination of one top pulse and cooling pulse.
Figure 2B:
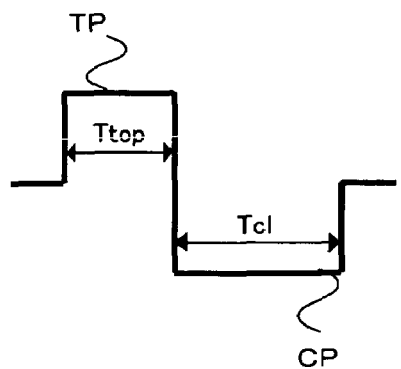
FIG. 2B is a chart of the waveform.

First of all, it is examined the recording marks of what length can be formed by the combination of one top pulse and one cooling pulse. FIG. 2A is a graph which shows a relation between the width Tcl of the cooling pulse CP and the recording mark length when the top pulse width Ttop is increased to 1.0T, 1.5T, 2.0T, by prescribing the width Ttop of the top pulse TP as a parameter. It is noted that the recording marks are measured after repeating over-writing 10 times, under a condition that the recording power Pr=18 mW and an erasing power Pe=9 mW at the recording speed being corresponding to about 4-times speed of a DVD. The width Tcl of the cooling pulse is varied until the marks cannot be accurately recorded. Thus, since shapes of the recording marks are distorted beyond a limit illustrated in the graph, and the marks cannot be appropriately recorded, the cooling pulse width cannot be increased further. The width Ttop of the top pulse TP and the width Tcl of the cooling pulse CP are prescribed as shown in FIG. 2B.

With reference to the graph in FIG. 2A, it is understood that longer recording marks can be formed by increasing the top pulse width Ttop and the cooling pulse width Tcl. However, no further effect is expected even if the top pulse width Ttop is further increased to be larger than Ttop=2.0T. No matter how long the cooling pulse width Tcl is increased within the limit at which the recording marks are not distorted, it is understood that only the recording marks of at most 5T can be formed. Namely, it is understood that the recording mark equal to or larger than 6T cannot be formed by the combination of one top pulse TP and one cooling pulse CP.

Figure 3A:
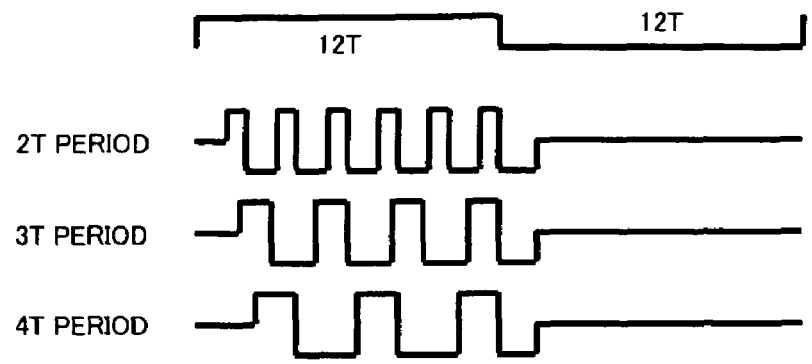
FIG. 3A is a waveform chart of multi-pulse trains of a plurality of periods.
Figure 3B:
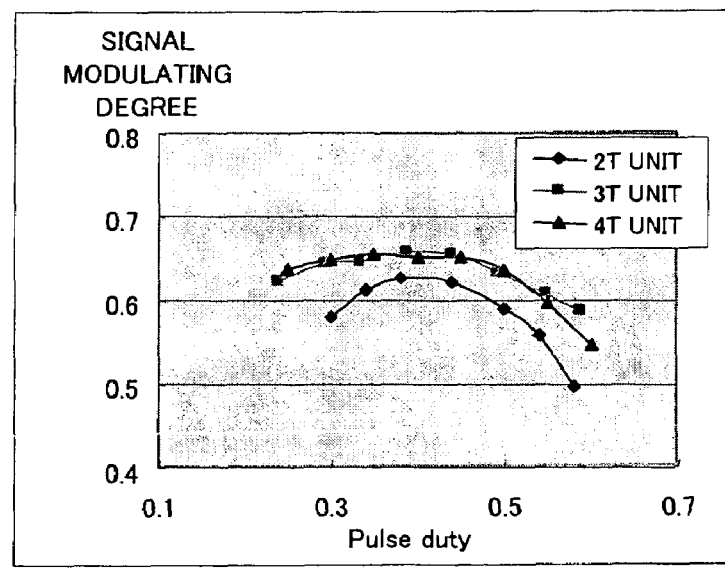
FIG. 3B is a graph showing signal modulating degrees of recording marks formed by the waveform.

Next, an appropriate period of the multi-pulse is examined. The number of the multi-pulses in the laser driving waveform depends on the recording mark length. In order to examine that a signal can be accurately recorded by the multi-pulse period of what length, the recording marks of 12T are recorded by prescribing the multi-pulse period as 3 kinds of periods, i.e., 2T, 3T and 4T periods, as shown in FIG. 3A. FIG. 3B is a graph which shows a relation between a pulse duty and a signal modulating degree, as to the recording marks of the 3 kinds of the multi-pulse periods. Here, the pulse duty is a ratio of an H (High) level period and an L (Low) level period in the multi-pulse period. The signal modulating degree is a value which indicates magnitude of a reproducing signal of the formed recording marks, and the value of the signal modulating degree becomes large when the recording marks are formed in accurate shapes.

With reference to the graph in FIG. 3B, when the multi-pulse period is 2T, it is understood that the signal modulating degree is maximum when the pulse duty is at about 0.4, while the signal modulating degree lowers comparatively largely when the pulse duty deviates from 0.4. On the other hand, when the multi-pulse period is 3T and 4T, the signal modulating degree is larger than that in a case of 2T, and the signal modulating degree comparatively indicates a flat characteristic against a variation of the pulse duty. Therefore, in view of the signal modulating degree, the multi-pulse period is preferred to be 3T or 4T, and there are few differences between the periods of 3T and 4T. However, it is generally recognized that the formed recording marks tend to be more easily distorted when the number of the recording pulses is small in the long mark recording, than those when the number of the recording pulses is large. In this point, it is recognized that an optimum multi-pulse width is 3T.

According to the above-mentioned examination, it is found out as follows: (1) the recording marks which are at least equal to or larger than 6T mark should be formed by the combination of the top pulse, the necessary number of the multi-pulses and the cooling pulse, and (2) it is preferred that the optimum multi-pulse width is 3T. As a result, it is understood that the preferred laser driving waveform (strategy) in the high-speed recording are the waveform having the top pulse and cooling pulse of pulse widths corresponding to the recording mark length as to the recording marks 3T to 5T, and the waveform having the top pulse, the multi-pulses of 3T period whose number corresponds to the recording mark length and the cooling pulse as to the recording marks equal to or larger than 6T, as schematically shown in FIG. 4. In this invention, it is possible to accurately form the recording marks even at the time of the high-speed recording, by utilizing such a strategy.

According to one aspect of the present invention, there is provided an information recording apparatus including a signal generating unit which generates a light source driving signal having a top pulse and multi-pulse of a necessary number corresponding to a recording mark length of recording data, and a recording unit which irradiates a recording light on an optical recording medium by driving a light source based on the light driving signal and forms recording marks on the optical recording medium, wherein the signal generating unit includes, a multi-pulse generating unit which generates a multi-pulse having a period 3-times larger than a base clock period T of the recording mark, and a top pulse generating unit which generates first identical-shape top pulses when the recording mark length is 3nT ("n" is an integral number), and second identical-shape top pulses when the recording mark length is (3n+1)T, and third identical-shape top pulses when the recording mark length is (3n+2) T. According to the above information recording apparatus, since the period of the multi-pulse is 3-times larger than the base clock period T of the recording mark, the recording can be accurately executed at the time of the high-speed recording.

In the above-mentioned information recording apparatus, the light source driving signal may include only the top pulse when the recording mark length is from 3T to 5T. The second top pulse width may be larger than the first top pulse width, and the third top pulse width may be larger than the second top pulse width.

In one feature of the above information recording apparatus, the third top pulse may be formed by two pulses. Thus, even when the recording marks cannot be preferably formed by one top pulse due to a recording characteristic of the optical disc subjected to recording, the recording marks can be preferably formed by two pulses.

In another feature of the above information recording apparatus, by making a back edge position of the multi-pulse correspond to the base clock position, back positions of the long recording marks are easy to align, and the recording with less recording and reproducing jitter is possible. Further, by making the cooling pulse portion width of the last multi-pulse included in the light source driving waveform corresponding to the recording marks equal to or larger than 6T constant, it is possible that back positions of the long recording marks are much easier to align.

In the above information recording apparatus, preferably, the back edges of two pulses forming the third top pulse may respectively correspond to the positions of 3T and 5T from rise-up of the recording data. Also, the top pulse width and the multi-pulse width may be equal to or larger than 0.5T.

In the above information recording apparatus, a time from rise-up of the recording data to a rise-up of the top pulse may be constant, irrespective of the recording mark length. Thus, the head positions of the recording marks are easy to align, and the recording with less recording and reproducing jitter is possible.

Moreover, in the above information recording apparatus, by making the power levels of the first to the third top pulses different from each other, preferable recording adapted to the recording characteristic of the optical disc is possible by adjusting not only the pulse width but also the recording power.

Next, the preferred embodiments of the present invention will be described below with reference to the attached drawings.

[Configuration of Information Recording and Reproducing Apparatus]

Figure 5:
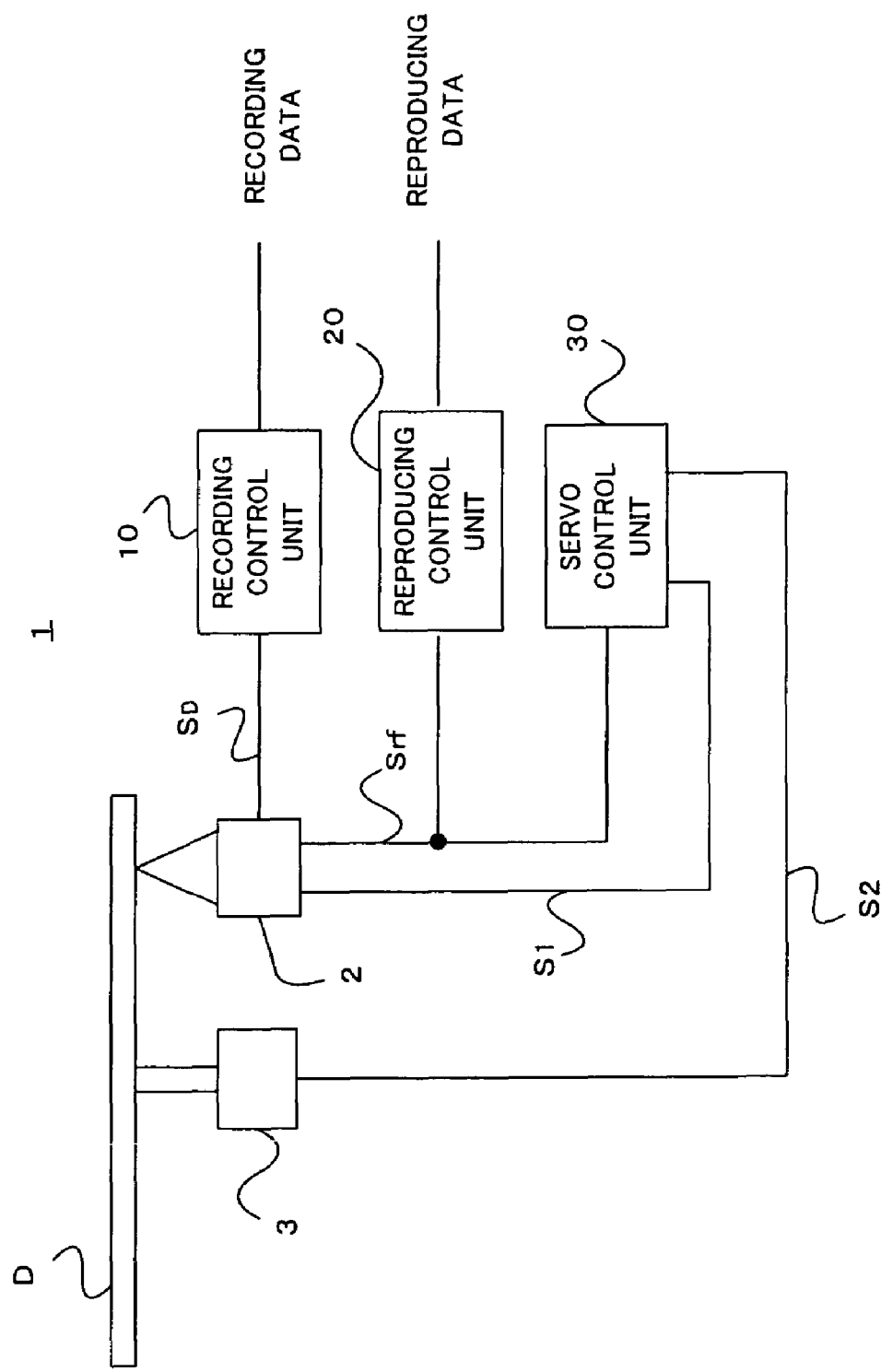
FIG. 5 is a block diagram showing a schematic configuration of an information recording and reproducing apparatus according to the embodiment of the present invention.

FIG. 5 schematically shows the whole configuration of the information recording and reproducing apparatus according to the embodiment of the present invention. An information recording and reproducing apparatus 1 records information on an optical disc D, and reproduces the information from the optical disc D. As the optical disc D, for example, a CD-RW (Compact Disc-Rewritable) or a DVD-RW, which are capable of erasing and recording the information a plurality of times, may be used.

The information recording and reproducing apparatus 1 includes an optical pickup 2 which irradiates a recording beam and a reproducing beam on the optical disc D, a spindle motor 3 which controls rotation of the optical disc D, a recording control unit 10 which controls the recording of the information on the optical disc D, a reproducing control unit 20 which controls reproduction of the information already recorded on the optical disc D, a spindle servo which controls rotation of the spindle motor 3, and a servo control unit 30 which executes various kinds of servo control including a focus servo and a tracking servo, both of width are relative position control of the optical pickup 2 to the optical disc D.

The recording control unit 10 receives the recording data and generates a driving signal $S_D$ for driving a laser diode inside the optical pickup 2 by a process described below, and supplies the signal $S_D$ to the optical pickup 2.

The reproducing control unit 20 receives a read-out RF signal Srf which is output from the optical pickup 2, and generates and outputs reproducing data by executing a predetermined demodulating process and decoding process to the signal Srf.

The servo control unit 30 receives the read-out RF signal Srf from the optical pickup 2, and, based on the signal, supplies a servo signal S1, such as a tracking error signal and a focus signal, to the optical pickup 2, and also supplies a spindle servo signal S2 to the spindle motor 3. Thus, various kinds of servo processes, such as a tracking servo, a focus servo and a spindle servo, are executed.

The present invention mainly relates to a method of the recording in the recording control unit 10, and various kinds of known methods can be applied, as to the reproducing control and the servo control. Therefore, an explanation thereof is not given in detail here.

Though FIG. 5 illustrates the information recording and reproducing apparatus as an example of the embodiment of the present invention, it is also possible to apply the present invention to an information recording apparatus dedicated to recording.

Figure 6:
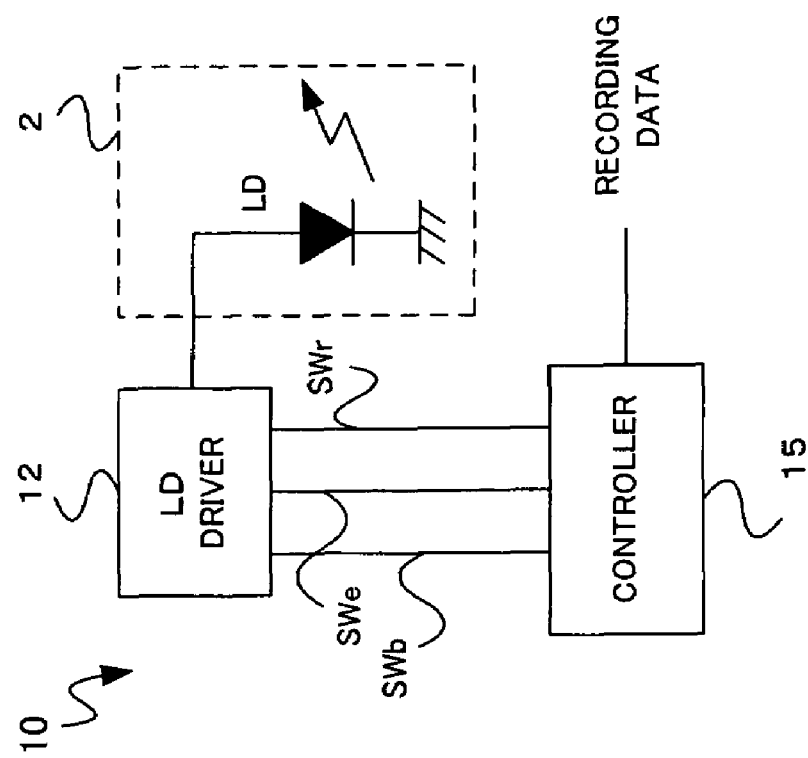
FIG. 6 is a block diagram showing a configuration of a recording control unit shown in FIG. 5.

FIG. 6 shows an internal configuration of the optical pickup 2 and the recording control unit 10. As shown in FIG. 6, the optical pickup 2 includes a laser diode LD which generates the recording beam for recording the information to the optical disc D and the reproducing beam for reproducing the information from the optical disc D.

The optical pickup 2 additionally includes well-known components such as a light detector which receives a reflected beam by the optical disc D of the reproducing beam and generates the read-out RF signal Srf, and an optical system which guides the recording beam, the reproducing beam and the reflected beam to appropriate directions. However, drawings and detailed explanations thereof are omitted here.

On the other hand, the recording control unit 10 includes a laser diode (LD) driver 12 and a controller 15. The LD driver 12 supplies a current corresponding to the recording signal to the laser diode LD, and records the information on the optical disc D.

Figure 7B:
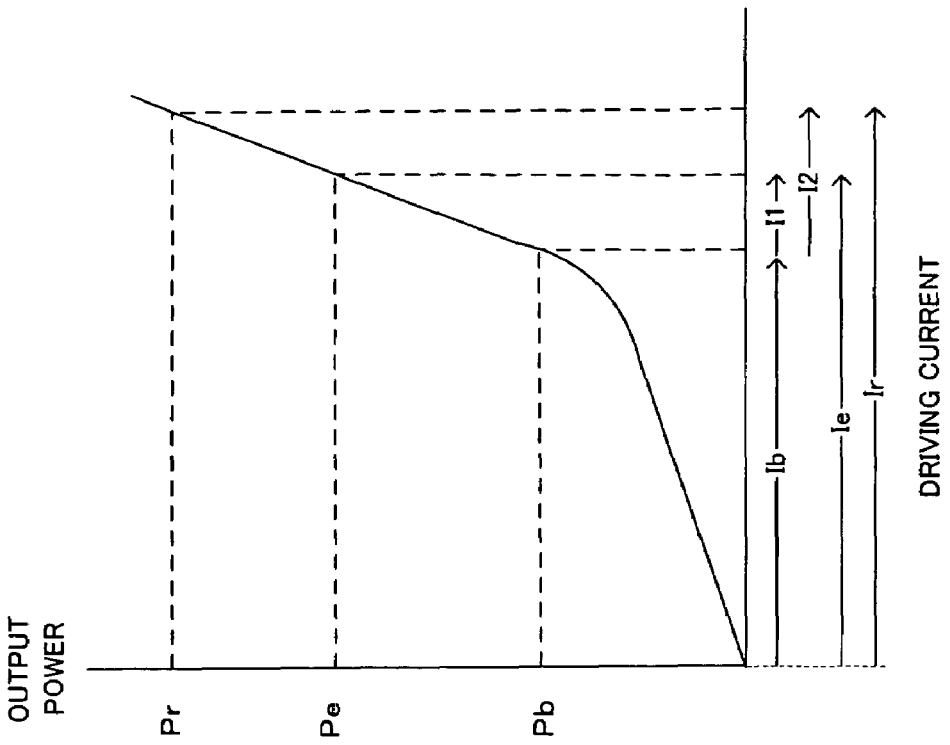
FIG. 7B is a graph showing a characteristic of a laser diode.
Figure 7A:
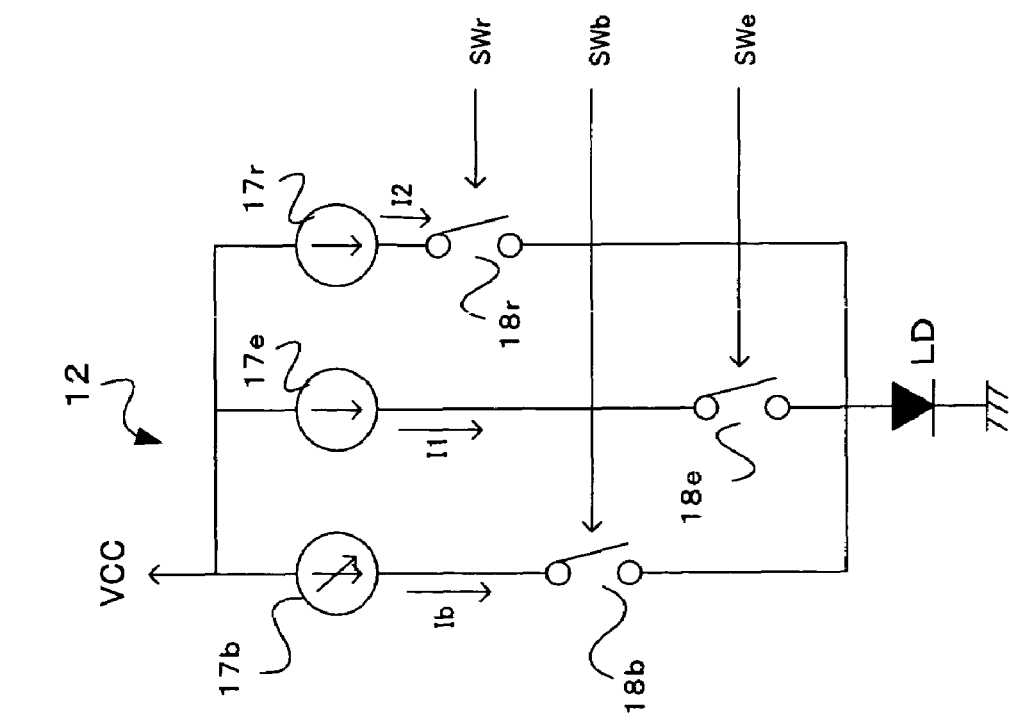
FIG. 7A is a circuit diagram showing a configuration of an LD driver shown in FIG. 6.

FIG. 7A shows a detailed configuration of the LD driver 12. As shown in FIG. 7A, the LD driver 12 includes a current source 17b for the bias power level, a current source 17e for the erasing power level, a current source 17r for the recording power level, switches 18b, 18e and 18r.

The current source 17b for the bias power level generates the flow of a driving current Ib for driving the laser diode LD to emit the laser light with the bias power Pb, and the driving current Ib is supplied to the laser diode LD via the switch 18b. Thus, when the switch 18b is switched on, the driving current Ib of the bias power is supplied to the laser diode LD, and when the switch 18b is switched off, the driving current Ib is not supplied.

The current source 17e for the erasing power level generates the flow of the driving current I1 for driving the laser diode LD to emit the laser light with the erasing Power Pe. The driving current I1 is supplied to the laser diode LD via the switch 18e. The driving current I1 is added to the driving current Ib of the bias power, and the driving current Ie of the erasing power is supplied to the laser diode LD via the switch 18e.

The current source 17r for the recording power level generates the flow of the driving current I2 for driving the laser diode LD to emit the laser light with the recording power Pr. The driving current I2 is supplied to the laser diode LD via the switch 18r. The driving current I2 is added to the driving current Ib of the bias power, and the driving current Ir of the recording power is supplied to the laser diode LD via the switch 18r.

Therefore, by controlling the ON/OFF of the switches 18b, 18e, and 18r, the laser diode LD serving as the laser light source can be driven with any one of the bias power Pb, the erasing power Pe or the recording power Pr.

FIG. 7B shows a relation between the driving current supplied to the laser diode LD and an output power of the laser light emitted from the laser diode LD. As understood in FIG. 7B, when the driving current Ib is supplied to the laser diode LD, the laser light is emitted by the bias power Pb. Moreover, when the driving current I1 is added under the condition, the laser light is emitted by the erasing power Pe. When the driving current I2 is added instead of the driving current I1, the laser light is emitted by the recording power Pr.

Embodiment of Strategy

Next, the description will be given of the embodiment of the strategy for the high-speed recording according to the present invention.

Basic Embodiment

Figure 8A:
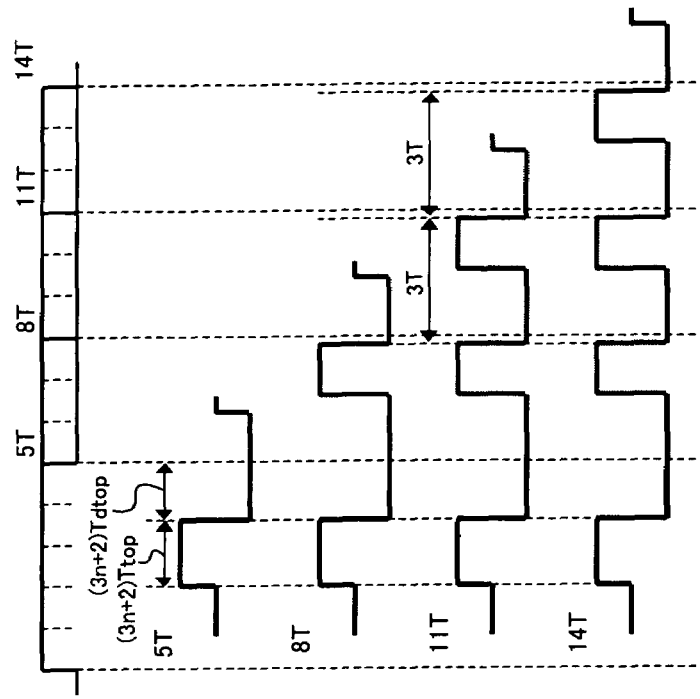
FIGS. 8A to 8C are diagrams showing laser driving waveforms (recording strategies) according to the basic embodiment of the present invention.
Figure 8B:
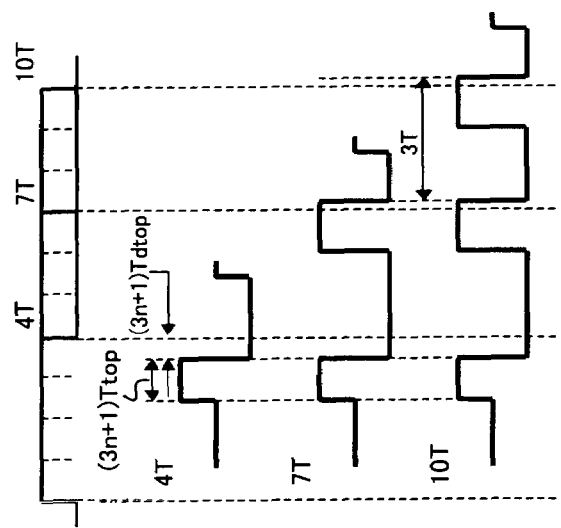
Figure 8C:
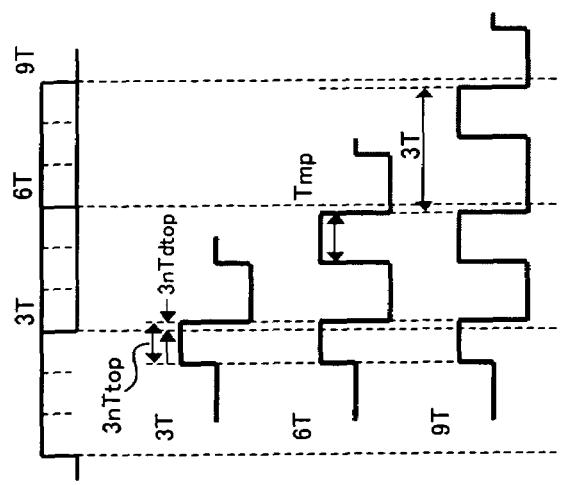

FIGS. 8A to 8C show the strategy according to a basic embodiment. The recording marks to be recorded on the disc, corresponding to the recording data, are 3T to 11T and 14T, and FIGS. 8A to 8C show the laser driving waveform corresponding to each recording mark length. In the embodiment of the present invention, the recording mark lengths 3T to 11T and 14T are classified into three groups. Concretely, as shown in FIGS. 8A to 8C, the lengths are classified into a group G1 of the recording mark length=3nT, a group G2 of the recording mark length=(3n+1)T, and a group G3 of the recording mark length=(3n+2)T. It is noted that "n" is a positive integral number from 1 to 4.

Namely, the recording mark lengths 3T, 6T and 9T belong to the group G1, and the laser driving waveforms thereof are illustrated in FIG. 8A. The recording mark lengths 4T, 7T and 10T belong to the group G2, and the laser driving waveforms thereof are illustrated in FIG. 8B. The recording mark lengths 5T, 8T and 11T belong to the group G3, and the laser driving waveforms thereof are illustrated in FIG. 8C. It is noted that the base clocks (1T period) of the recording data are indicated at the top of each drawing.

As explained above, the laser driving waveforms corresponding to the recording mark lengths 3T to 5T are formed by the combination of the top pulse TP and the cooling pulse CP, and no multi-pulses are included. Also, in the laser driving waveforms of the recording mark lengths 3T to 5T, the top pulse width Ttop and the cooling pulse width Tcl are determined according to the recording mark lengths. Namely, the top pulse width Ttop and the cooling pulse width Tcl are shortest at 3T, middle at 4T and longest at 5T.

The laser driving waveforms of the recording mark lengths 6T to 8T are respectively formed by the top pulse, the cooling pulse and one multi-pulse. The laser driving waveforms of the recording mark lengths 9T to 11T are respectively formed by the top pulse, the cooling pulse, and two multi-pulses. The laser driving waveform of the recording mark length 14T is formed by the top pulse, the cooling pulse and three multi-pulses.

As understood in FIGS. 8A to 8C, as to the recording mark length belonging to each group, the shapes of the top pulses are identical and regularly formed. Namely, the laser driving waveforms of the recording mark lengths 3T, 6T and 9T belonging to the group G1 have the identical-shape top pulses, and the laser driving waveforms of the recording mark lengths 4T, 7T and 10T belonging to the group G2 have the identical-shape top pulses. The laser driving waveforms of the recording mark lengths 5T, 8T, 11T and 14T belonging to the group G3 have the identical-shape top pulses.

Further, all the laser driving waveforms of the recording mark lengths equal to or larger than 6T, each including one or more multi-pulse have the identical-shape multi-pulses whose periods are 3T. The aforementioned conclusion that the optimum multi-pulse period is 3T is reflected in this point.

As explained above, in the embodiment, based on the above-mentioned examined result, the laser driving waveforms of the recording marks equal to or smaller than 5T are formed by the combination of the top pulse and the cooling pulse, and the top pulse width and the cooling pulse width are determined according to the recording mark lengths. The laser driving waveforms of the recording marks equal to or larger than 6T are formed by the top pulse, the multi-pulses whose number corresponds to the recording mark lengths, and the cooling pulse. Thus, it is possible to form pits of accurate shape at the time of the high-speed recording.

(1st Modification)

Figure 9A:
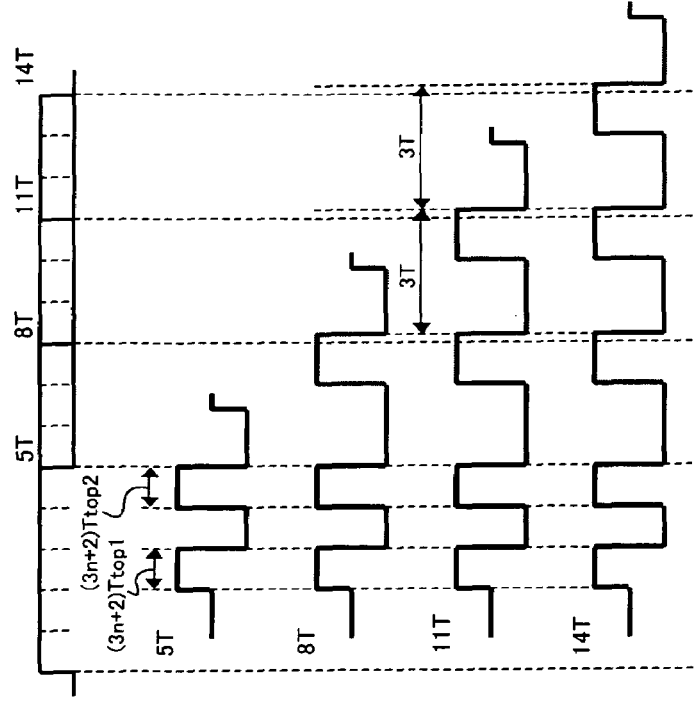
FIGS. 9A to 9C are diagrams showing laser driving waveforms (recording strategies) according to the first modification of the present invention.
Figure 9B:
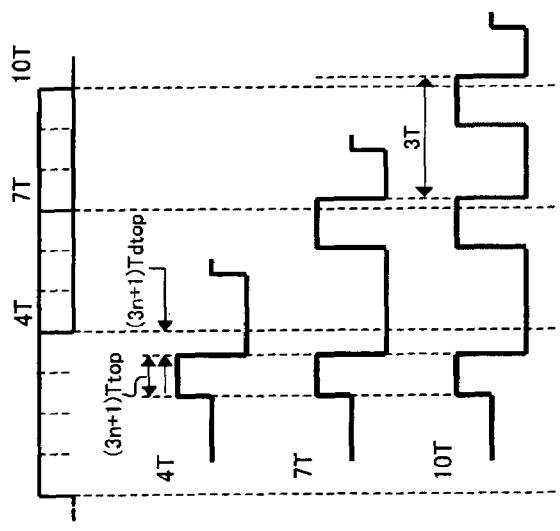
Figure 9C:
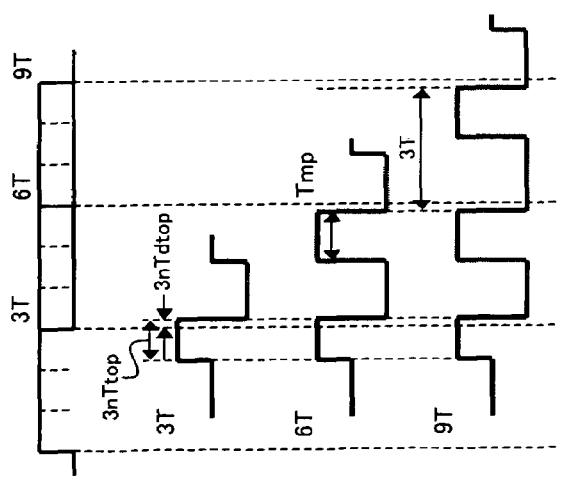

Next, the strategy according to the first modification will be explained. FIGS. 9A to 9C show the laser driving waveform of each recording mark length according to the first modification. The first modification is different from the basic embodiment in that the top pulse TP is formed by the two pulses for the recording mark belonging to the group G3. In the first modification, the laser driving waveforms of the recording mark lengths belonging to the groups G1 and G2 are identical to those of the basic embodiment shown in FIGS. 8A to 8C.

As to the recording marks belonging to the group G3, i.e., 5T, 8T, 11T and 14T, it is determined whether the top pulse TP is one, like the basic embodiment shown in FIGS. 8A to 8C, or two, like the first modification, dependently on the recording characteristic of the optical disc subjected to the recording. Namely, the first modification is effective when 5T mark can not be preferably formed by only a pair of the top pulse TP and the cooling pulse CP like the basic embodiment, or when distortion occurs to the marks 8T, 11T and 14T by only one top pulse TP.

(2nd Modification)

Figure 10A:
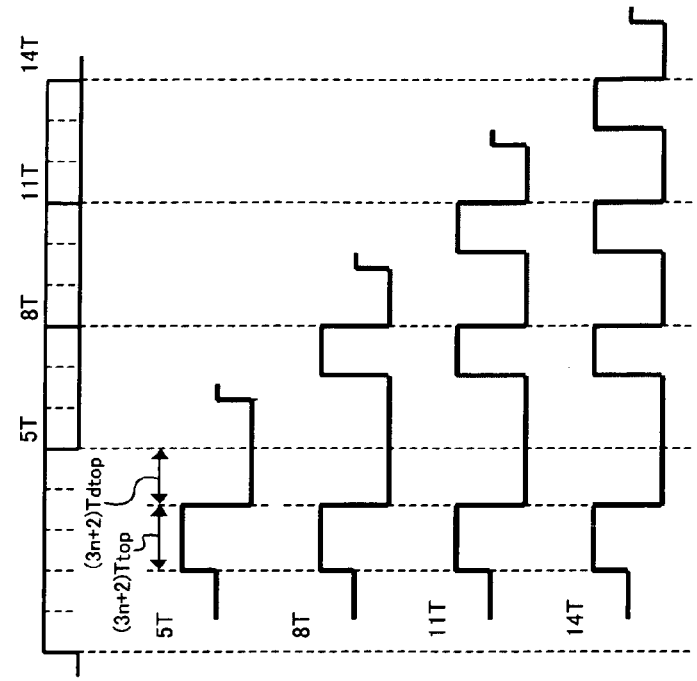
FIGS. 10A to 10C are diagrams showing laser driving waveforms (recording strategies) according to the second modification of the present invention.
Figure 10B:
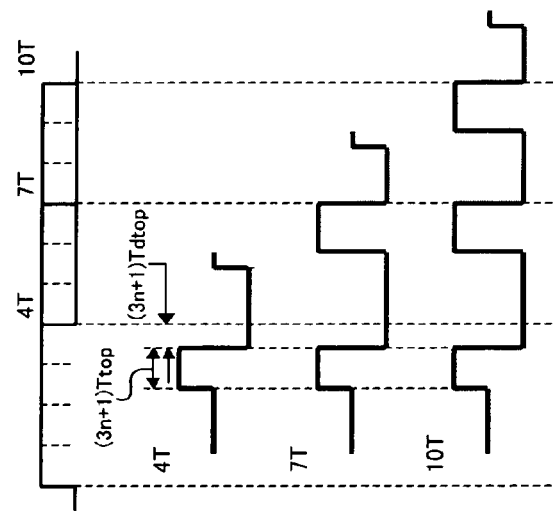
Figure 10C:
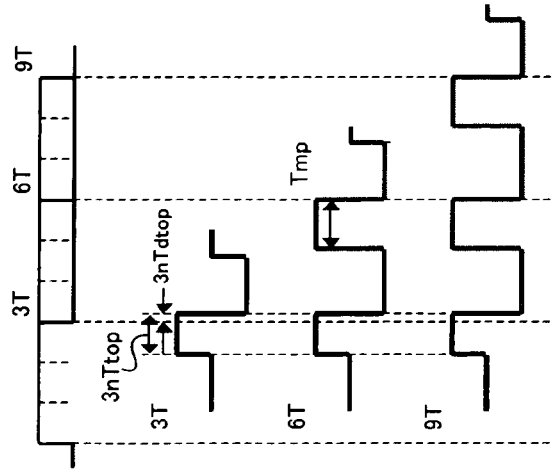

Next, the strategy according to the second modification will be explained. FIGS. 10A to 10C show the laser driving waveform of each recording mark according to the second modification. As shown in FIGS. 10A to 10C, the back edge of the multi-pulse train of the recording mark equal to or larger than 6T corresponds to the base clock of 1T period in the second modification. Because of this, since the back end positions of the long recording marks are easy to align with each other, the recording with less recording and reproducing jitter is possible.

(3rd Modification)

Figure 11A:
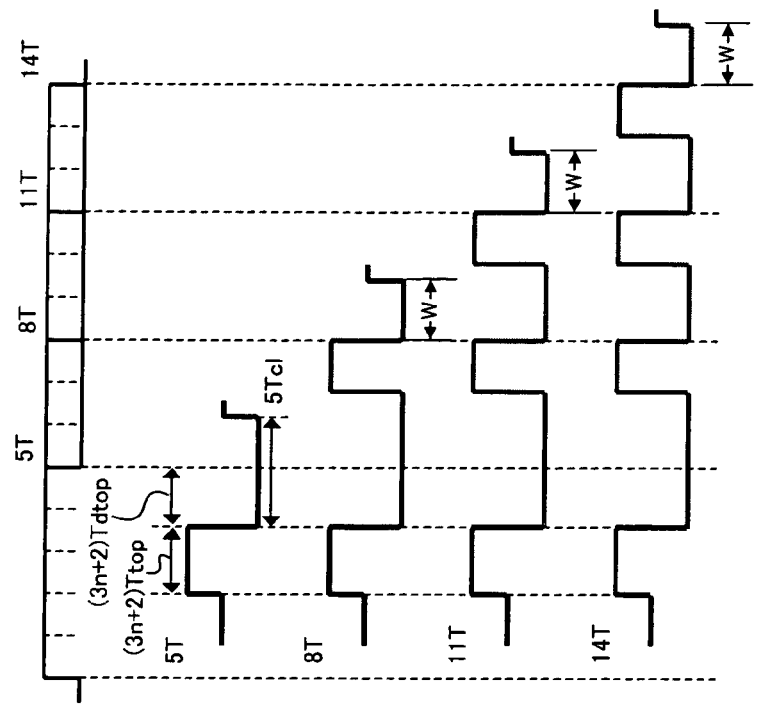
FIGS. 11A to 11C are diagrams showing laser driving waveforms (recording strategies) according to the third modification of the present invention.
Figure 11B:
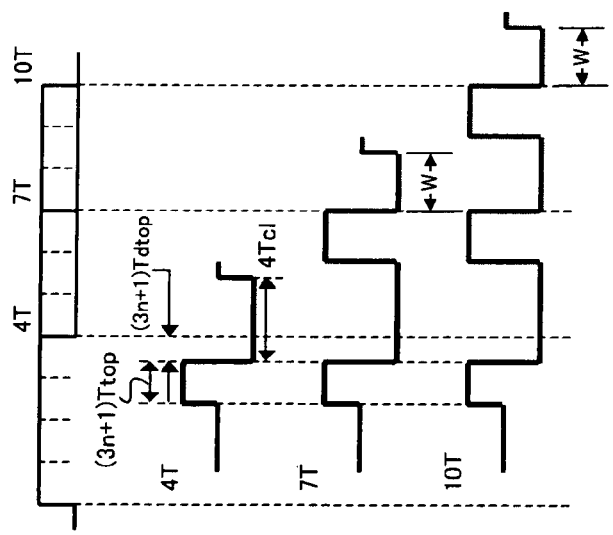
Figure 11C:
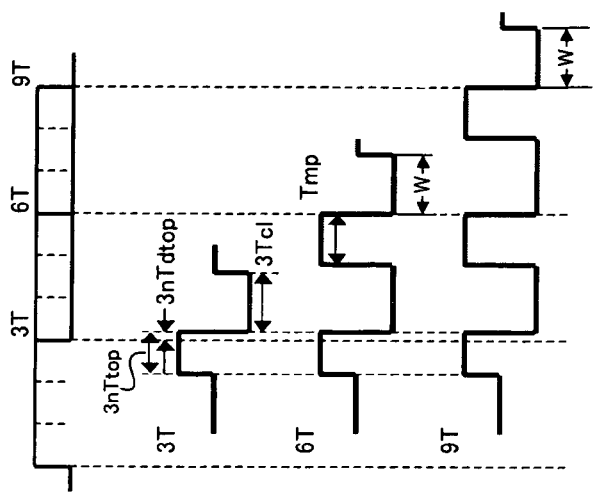

Next, the strategy according to the third modification will be explained. FIGS. 11A to 11C show the laser driving waveform of each recording mark according to the third modification. In the third modification, in addition to the basic embodiment shown in FIGS. 8A to 8C, first of all, identically to the second modification shown in FIGS. 10A to 10C, the back edge of the multi-pulse train of the recording mark equal to or larger than 6T corresponds to the base clock of 1T period, and further, the width of the cooling pulse portion of the last multi-pulse in the laser driving waveform of the recording mark equal to or larger than 6T is made identical. Namely, as shown in FIGS. 11A to 11C, for all the recording marks equal to or larger than 6T, the width of the cooling pulse portion of the last multi-pulse is set to "W".

According to the third embodiment, while the position of the short recording mark which is formed by the combination of the top pulse and the cooling pulse is kept adjustable, the back positions of the long recording marks are easier to align than that in the second modification, and the preferable recording with less recording and reproducing jitter is possible.

(4th Modification)

Figure 12A:
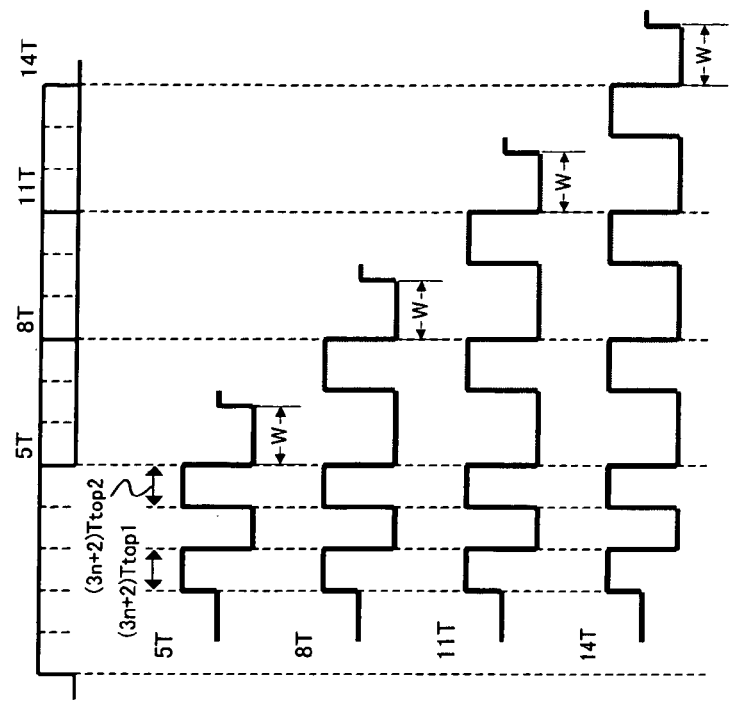
FIGS. 12A to 12C are diagrams showing laser driving waveforms (recording strategies) according to the fourth modification of the present invention.
Figure 12B:
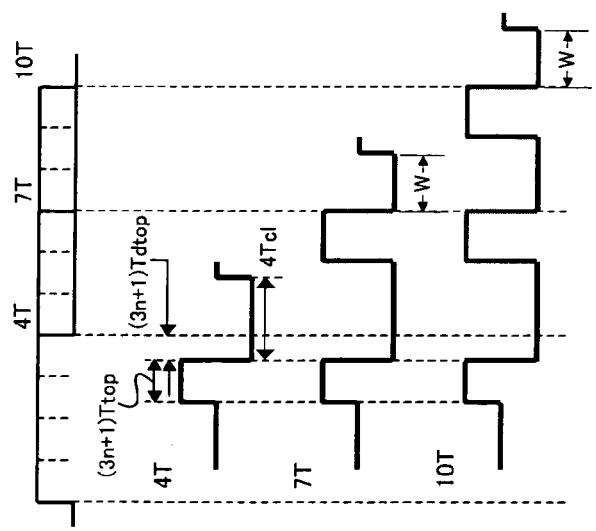
Figure 12C:
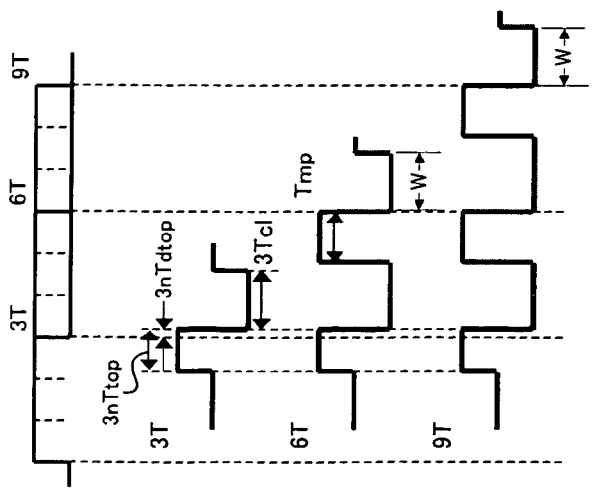

Next, the strategy according to the fourth modification will be explained. FIGS. 12A to 12C show the laser driving waveform of each recording mark according to the fourth modification. In the fourth modification, first of all, identically to the first modification shown in FIGS. 9A to 9C, the top pulses of the recording marks 5T, 8T, 11T and 14T belonging to the group G3 are respectively formed by two pulses. The back edges of two top pulses of the laser driving waveform of the recording mark belonging to the group G3 are respectively adjusted to the positions of 3T and 5T from the rise-up of the recording data. Moreover, identically to the third modification, the back edge of the multi-pulse train of the recording mark equal to or larger than 6T corresponds to the base clock of 1T, and the width of the cooling pulse portion of the last multi-pulse in the laser driving waveform of the recording mark equal to or larger than 5T is made identical ("W").

According to the fourth modification, while the positions of the recording marks 3T and 4T which are formed by the combination of the top pulse and the cooling pulse are kept adjustable, the back position of the long recording mark is much easier to align than the second modification, and the preferable recording with less recording and reproducing jitter is possible.

A table in FIG. 13 shows an example of each value in the laser driving waveform in the fourth modification. FIG. 13 shows two examples of the recording speed corresponding to 4-times higher speed of the DVD. It is noted that sign of 3nTdtop and (3n+1)Tdtop is indicated as positive when the back edge of the top pulse is ahead of the base clock (i.e., it shifts to the left side), and the sign is indicated as negative when the back edge of the top pulse is behind of the base clock (i.e., it shifts to the right side).

(5th Modification)

Next, the fifth modification will be explained. The fifth modification is a case that the pulse widths of the top pulse TP and multi-pulse MP of the basic embodiment shown in FIGS. 8A to 8C are limited. Concretely, they are determined as follows, Top pulse width of group G1: $0.5T \leq 3nTtop \leq 3T$
Top pulse width of group G2: $0.5T \leq (3n+1)Ttop \leq 3T$
Top pulse width of group G3: $0.5T \leq (3n+2)Ttop \leq 3T$
Multi-pulse width of each group: $0.5T \leq Tmp \leq 2.5T$.

As explained above, for example, 1T is equal to about 10 ns, and 0.5T is equal to about 5 ns in 4-times higher speed recording of the DVD. Since the pulse width smaller than 5 ns is too narrow as shown in FIG. 1, the recording marks cannot be accurately formed. That is why each top pulse width and multi-pulse width is determined to be larger than 0.5T. In addition, since an L-level period of the multi-pulse becomes equal to or smaller than 0.5T if the multi-pulse width is equal to or larger than 2.5T, the multi-pulse width is determined to be smaller than 2.5T.

Like this, by limiting the pulse width in each portion of the laser driving waveform, it is possible that the recording is executed in an area in which an accurate laser emitting waveform is obtained.

(6th Modification)

Next, the sixth modification will be explained. The sixth modification is a case that the pulse widths of the top pulse TP and the multi-pulse MP in the first modification shown in FIGS. 9A to 9C are limited. Concretely, they are determined as follows, Top pulse width of group G1: $0.5T \leq 3nTtop \leq 3T$
Top pulse width of group G2: $0.5T \leq (3n+1)Ttop \leq 3T$
First top pulse width of group G3: $0.5T \leq (3n+2)Ttop1 \leq 2T$
Second top pulse width of group G3: $0.5T \leq (3n+2)Ttop2 \leq 1.5T$
Multi-pulse width of each group: $0.5T \leq Tmp \leq 2.5T$.

Here, the reason why each top pulse width and multi-pulse width is determined to be equal to or larger than 0.5T is identical to the reason which is mentioned in the fifth modification. As understood in FIGS. 7A and 7B, since the top pulse in the group G3 is formed by two pulses in the first modification, a range of the pulse width is set for each pulse. Thus, by limiting the pulse width in each portion of the laser driving waveform, it is possible that the recording is executed in the area in which the accurate laser emitting waveform is obtained in the sixth modification, too.

(7th Modification)

Figure 14A:
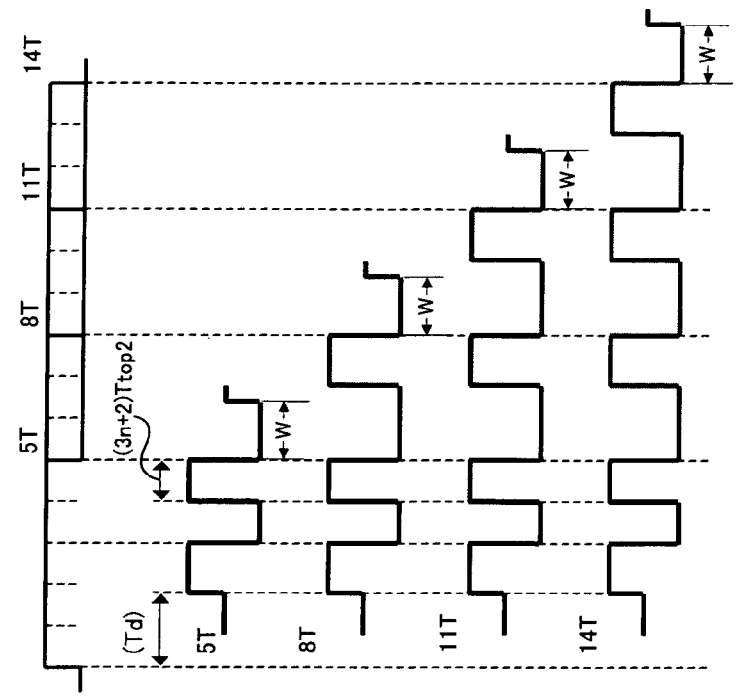
FIGS. 14A to 14C are diagrams showing laser driving waveforms (recording strategies) according to the seventh modification of the present invention.
Figure 14B:
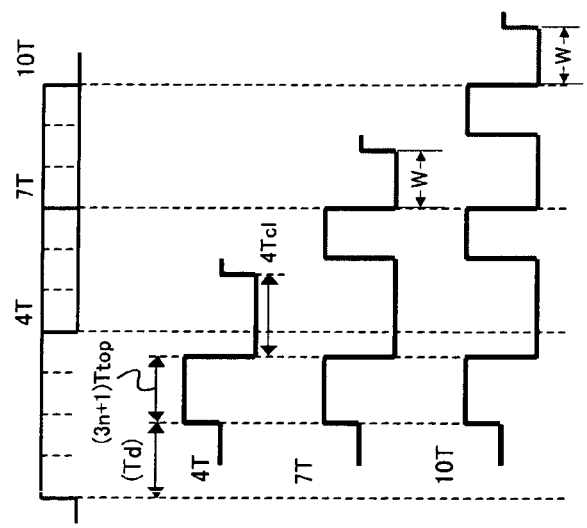
Figure 14C:
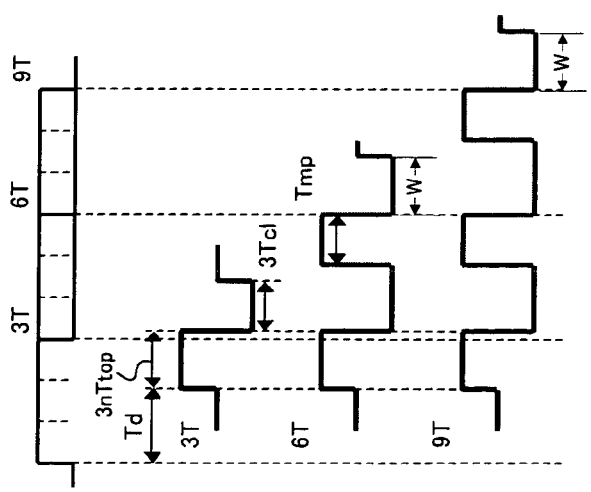

Next, the seventh modification will be explained. The seventh modification is a case that a time Td from the rise-up of the recording data to the rise-up of the top pulse is set to be constant, irrespective of the recording mark length, in the above-mentioned basic embodiment and the first to sixth modifications. As an example, FIGS. 14A to 14C show the laser recording waveforms of a case that the seventh modification is applied to the fourth modification shown in FIGS. 12A to 12C. As shown in FIGS. 14A to 14C, irrespective of the recording mark length, the time Td from the rise-up of the recording data to the rise-up of the top pulse is constant in all the laser recording waveforms. Thus, since the rise-up positions of the top pulses are aligned in all the recording marks in the seventh modification, the head position of each recording mark is easy to align with each other, and the preferable recording with less recording and reproducing jitters is possible.

(8th Modification)

Figures 15A, 15B, 15C:
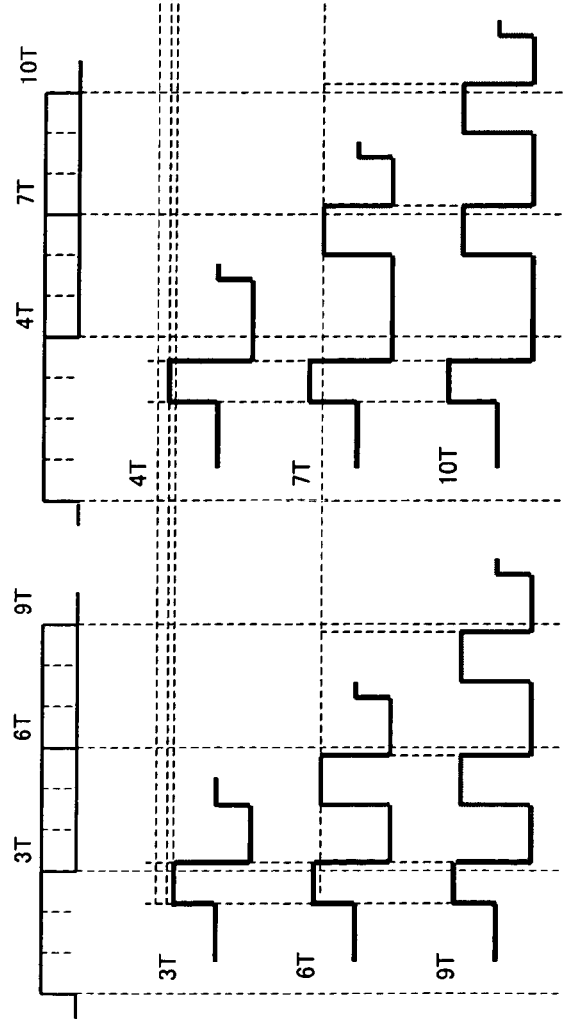
FIGS. 15A to 15C are diagrams showing laser driving waveforms (recording strategies) according to the eighth modification of the present invention.

Next, the eighth modification will be explained. The eighth modification is a case that the recording power level of each top pulse portion in three groups G1 to G3 are set to be different from each other for the above-mentioned basic embodiment and the first to seventh modifications. FIGS. 15A to 15C show the laser driving waveforms of a case that the eighth modification is applied to the basic modification shown in FIGS. 8A to 8C. As understood in FIGS. 15A to 15C, the recording power level of the top pulse in each group G1 to G3 is $$3nTPw \leq (3n+1)TPw \leq (3n+2)TPw,$$

if it is defined that the recording power level of the top pulse in the group G1 is "3nTPw", the recording power level of the top pulse in the group G2 is "(3n+1)TPw", and the recording power level of the top pulse in the group G3 is "(3n+2)TPw".

Thus, in the eighth modification, by adjusting the recording power to adapt to the recording characteristic of the optical disc subjected to the recording in addition to the pulse width, the preferable recording adapted to the recording characteristic of the optical disc is possible.

Though examples shown in FIGS. 15A to 15C indicate examples that the recording power levels becomes larger in the order of the groups G1 to G3, an application of the eighth embodiment is not limited to this. Namely, the recording power level can be suitably determined according to the pulse width of each portion in the laser driving waveform of each group.

INDUSTRIAL APPLICABILITY

The information recording apparatus and the information recording method according to this invention can be used at the time of recording the information onto the optical disc by using the laser light and the like.

The invention claimed is:

1. An information recording apparatus comprising:
a signal generating unit which generates a light source driving signal having a top pulse and multi-pulse of a necessary number corresponding to a recording mark length of recording data; and
a recording unit which irradiates a recording light on an optical recording medium by driving a light source based on the light driving signal and forms recording marks on the optical recording medium, wherein the signal generating unit includes:
a multi-pulse generating unit which generates a multi-pulse including plural pulses each having a period 3-times larger than a base clock period T of the recording mark; and
a top pulse generating unit which generates first identical-shape top pulses for recording marks when recording 3nT mark length, and second identical-shape top pulses for recording marks, when recording at (3n+1)T mark length, and third identical-shape top pulses for recording marks when recording at (3n+2)T mark length wherein the third pulse is a multi-pulse formed by two pulses and n is a positive number from 1-4.

2. The information recording apparatus according to claim 1, wherein the light source driving signal includes only the top pulse when the recording mark length is 3T to 5T.

3. The information recording apparatus according to claim 1, wherein a width of the second top pulse is larger than a width of the first top pulse, and wherein a width of the third top pulse is larger than a width of the second top pulse.

4. The information recording apparatus according to claim 1, wherein a back edge position of the multi-pulse corresponds to a position of the base clock.

5. The information recording apparatus according to claim 1, wherein the multi-pulse includes a cooling pulse portion, and wherein widths of the cooling pulse portions of last multi-pulses included in a light source driving waveform corresponding to a recording mark larger than 6T are identical.

6. The information recording apparatus according to claim 1, wherein the back edges of two pulses forming the third top pulse respectively correspond to positions of 3T and 5T from rise-up of the recording data.

7. The information recording apparatus according to claim 1, wherein widths of the top pulse and the multi-pulse are equal to or larger than 0.5T.

8. The information recording apparatus according to claim 1, wherein a time from a rise-up of the recording data to a rise-up of the top pulse is constant irrespective of the recording mark length.

9. The information recording apparatus according to claim 1, wherein power levels of the first to third top pulses are different from each other.

10. An information recording method comprising:
a signal generating process which generates a light source driving signal having a top pulse and multi-pulse of a necessary number corresponding to a recording mark length of recording data; and
a recording process which irradiates a recording light on an optical recording medium by driving a light source based on the light driving signal, and forms recording marks on the optical recording medium, wherein the signal generating process including:
a multi-pulse generating process which generates a multi-pulse including plural pulses each having a period 3-times larger than a base clock period T of the recording mark; and
a top pulse generating unit which generates first identical-shape top pulses for recording marks when recording 3nT mark length, and second identical-shape top pulses for recording marks, when recording at (3n+1)T mark length, and third identical-shape top pulses for recording marks when recording at (3n+2)T mark length, wherein the third pulse is a multi-pulse formed by two pulses and n is a positive number from 1-4.

11. The information recording apparatus according to claim 1, wherein the third top pulse is formed by two separate pulses.

12. The information recording method according to claim 10, wherein the third top pulse is formed by two separate pulses.

13. The information recording apparatus according to claim 1, wherein the third top pulse comprises a first portion having a first level, a second portion following the first portion and having a second level lower than the first level and a third portion following the second portion and having the first level.

14. The information recording method according to claim 10, wherein the third top pulse comprises a first portion having a first level, a second portion following the first portion and having a second level lower than the first level and a third portion following the second portion and having the first level.

* * * * *

UNITED STATES PATENT AND TRADEMARK OFFICE
CERTIFICATE OF CORRECTION

| | | |
|---|---|---|
| PATENT NO. | : 7,586,823 B2 | Page 1 of 1 |
| APPLICATION NO. | : 10/546719 | |
| DATED | : September 8, 2009 | |
| INVENTOR(S) | : Yamaguchi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 789 days.

Signed and Sealed this

Twenty-first Day of September, 2010

David J. Kappos
*Director of the United States Patent and Trademark Office*